United States Patent
Negahdar

(10) Patent No.: US 8,266,424 B2
(45) Date of Patent: Sep. 11, 2012

(54) METHOD AND SYSTEM FOR IN-FIELD RECOVERY OF SECURITY WHEN A CERTIFICATE AUTHORITY HAS BEEN COMPROMISED

(75) Inventor: Ali Negahdar, Suwanee, GA (US)

(73) Assignee: ARRIS Group, Inc., Suwanee, GA (US)

( * ) Notice: Subject to any disclaimer, the term of this patent is extended or adjusted under 35 U.S.C. 154(b) by 1336 days.

(21) Appl. No.: 11/395,588

(22) Filed: Mar. 30, 2006

(65) Prior Publication Data

US 2006/0236379 A1    Oct. 19, 2006

Related U.S. Application Data

(60) Provisional application No. 60/666,434, filed on Mar. 30, 2005.

(51) Int. Cl.
*H04L 29/00* (2006.01)

(52) U.S. Cl. ........ 713/155; 713/156; 713/175; 713/176; 713/180

(58) Field of Classification Search .................. 380/277; 726/2, 4, 5, 14; 713/156, 160, 175, 176, 713/180, 155; 235/379
See application file for complete search history.

(56) References Cited

U.S. PATENT DOCUMENTS

| | | | | |
|---|---|---|---|---|
| 5,867,578 A * | 2/1999 | Brickell et al. | ............... | 713/180 |
| 6,598,057 B1 * | 7/2003 | Synnestvedt et al. | .................. | 1/1 |
| 6,705,517 B1 * | 3/2004 | Zajkowski et al. | ............ | 235/379 |
| 6,715,075 B1 * | 3/2004 | Loukianov | ..................... | 713/176 |
| 7,302,487 B2 * | 11/2007 | Ylonen et al. | ................ | 709/229 |
| 7,305,550 B2 * | 12/2007 | Oliver et al. | ................... | 713/156 |
| 2002/0116655 A1 * | 8/2002 | Lew et al. | ..................... | 713/323 |

* cited by examiner

*Primary Examiner* — Vivek Srivastava
*Assistant Examiner* — Helai Salehi
(74) *Attorney, Agent, or Firm* — Troy A. Van Aacken; Robert J. Starr

(57) ABSTRACT

A certificate credential is generated based on a user device's private key securely stored, or accessible, by a certificate authority. When the certificate authority has been compromised, the credential, which typically includes information encrypted with the device's private key and the corresponding unencrypted information, is sent to the device. The device receives the information in encrypted and unencrypted form and decrypts the encrypted information. If the result of the decryption matches the unencrypted information, the device trusts the signer of the credential.

16 Claims, 1 Drawing Sheet

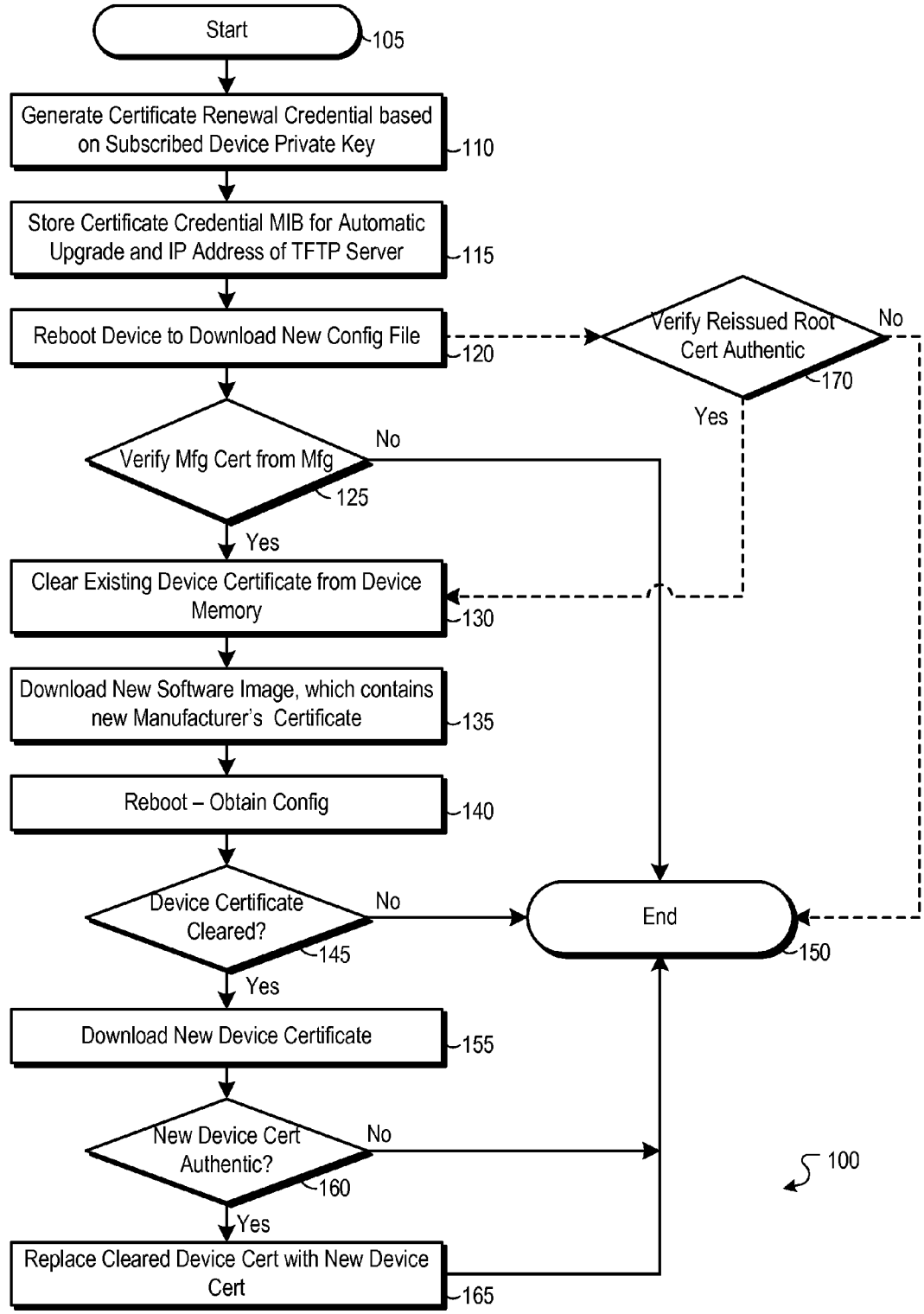

METHOD AND SYSTEM FOR IN-FIELD RECOVERY OF SECURITY WHEN A CERTIFICATE AUTHORITY HAS BEEN COMPROMISED

CROSS REFERENCE TO RELATED APPLICATION

This application claims priority under 35 U.S.C. 119(e) to U.S. provisional patent application No. 60/666,434 entitled "Certificate authority compromise and EMTA/CM recovery in the field," which was filed Mar. 30, 2005, and is incorporated herein by reference in its entirety.

FIELD OF THE INVENTION

This invention relates, generally, to communication networks and devices and, more particularly, to ensuring secure communication when a certificate authority has been compromised.

BACKGROUND

Data-Over-Cable Service Interface Specifications ("DOCSIS") has been established by cable television network operators to facilitate transporting data traffic, primarily internet traffic, over existing community antenna television ("CATV") networks. In addition to transporting data traffic as well as television content signals over a CATV network, multiple services operators ("MSO") also use their CATV network infrastructure for carrying voice, video on demand ("VoD") and video conferencing traffic signals, among other types.

An MSO may use what is known in the art as PacketCable for providing telephony services to users. PacketCable™, which is a trademark of CableLabs®, facilitates the presentation of a transparent interface to a user with respect to operation of the network. In other words, a user plugs a standard telephone into a user device, which presents to the telephone what appears to be a traditional plain old telephony service ("POTS") line card interface. However, the user device transforms analog POTS signals to and from the telephone from/to internet packets.

Such a user device typically includes a media terminal adaptor ("MTA") that performs processing of signals between the telephone and the network interface portions of the user device. When a user device, such as one containing an MTA, performs processing of telephony signals for transport over a network according to PacketCable, secure provisioning of the MTA device is performed according to procedures set forth in the PacketCable specification. Such secure provisioning ensures that the device securely receives information that allows it to confirm with the network that it is the device it purports to be. Transporting of the user device configuration data as specified in the PacketCable specification is typically performed securely according to protocols and procedures that prevent unauthorized access to information related to the user device and associated user.

Similarly, DOCSIS has a method for confirming that information purporting to be from the cable modem is in fact from the cable modem. Both PacketCable and DOCSIS use certificates issued by certificate authorities.

As known in the art, a certificate authority ("CA") issues a certificate that binds a public key to other information, including the name of the entity that owns the certificate and the public key. Thus, if a receiving entity receives data that is signed by a sender entity along with the sender entity's certificate, and the receiving entity is in possession and trusts the certificate authority chain that has signed the sender entity certificate, then the receiving entity can trust that the data is from the sending entity that is named in the certificate.

However, if the certificate authority is compromised, such as would occur if security procedures were not followed properly, then all the issued certificates under the certificate authority hierarchy up to the compromised certificate authority become invalid. Therefore the receiving entity can no longer trust the sender entity certificate or its signature. When the number of certificates under a compromised CA is limited, such as a web server CA that issues a limited number of certificates to its web site servers, the certificate authority can typically recover easily. By reissuing the compromised CA certificates in the hierarchy and the end entity certificates, the operator can manually and securely re-provision the new end entity certificates and keys on each compromised unit.

The solution may not be so easy, however, in the case where hundreds of thousands, if not millions, of devices each need their own certificate. Such an example may be cable modem and MTA devices, or digital subscriber line ("DSL") modems used by subscribers at their homes and/or offices. The solution is not simple or easy because the public key contained in a certificate is associated with a private key embedded in the device to which the certificate corresponds. The private keys are typically embedded into the device's memory, such as nonvolatile memory, when the device is manufactured. Thus, to install new certificates and keys securely to each of the large number of subscriber devices could require return of each of the thousands or millions of devices to the manufacturer.

Therefore, there is a need in the art for a method and system for distributing new device certificates to a plurality of subscriber devices without the need for physically returning the devices to a manufacturing location for replacement of the devices' certificates and private key(s)

BRIEF DESCRIPTION OF DRAWINGS

FIG. 1 illustrates a flow diagram for a method for remotely updating a subscriber device's certificate.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Turning to FIG. 1, a flow diagram of a method 100 for updating a subscriber device's certificate is shown. Method 100 starts at step 105 and a certificate renewal credential is generated at step 110. The certificate renewal credential is generated based on the existing private key stored in the subscriber device's memory. The need to generate a new certificate could be the result of a manufacturer's certificate, the root certificate, or other certificate having been compromised. Method 100 illustrates the steps for updating the device certificate when the manufacturer's certificate is compromised. Similar steps are used when certificate authorities at other levels are compromised.

The certificate renewal credential is generated based on the private key that is embedded in the subscriber device. The manufacturer of the devices typically securely maintains a private key database that lists all of the subscriber devices' private keys and their associated device information, such as, for example, device serial number, MAC address(s), etc. Even if the manufacturer CA is compromised, the individual private keys of the devices are typically maintained in a secure manner are still valid. Thus, the manufacturer can generate a credential that upon receipt at the subscriber device assures the subscriber device that the credential and attached information indeed is from the manufacturer. This allows the subscriber device to 'trust' information from the manufacturer.

The certificate credential information may include a set of information that is encrypted with the subscriber device's private key. This encrypted information is sent along with the same set of information in an unencrypted form. The manufacturing CA certificate credential is included with management information base information and the IP address of a TFTP server in a device configuration file at step 115. A message to reboot is sent to the subscriber device(s) in the field and upon reboot at step 120.

Upon reboot, which process includes obtaining a configuration file as known in the art, credential information is retrieved from the configuration file and verified at step 125. At step 125, a determination is made whether the certificate credential indicates that the CA indicated in the credential is the manufacturing CA that the device can trust. This determination is performed by encrypting, or signing, some information known to the device, or an unencrypted information set sent in the credential. The device's private key is used to perform the encryption, or signing. verification of the credential at the device results in a determination that the CA that issued the certificate credential is indeed the manufacturing CA, and the process continues to step 130. If the credential is not verified, the process ends at step 150.

If the process has continued from step 125 to step 130, the device clears the memory space where the currently existing device certificate is stored at step 130. This space may be cleared by overwriting the space with other data, including null information, thus rendering the memory space blank, or 'cleared', or the memory space may be overwritten with other temporary data. After clearing, or overwriting, the existing device certificate at step 130, a now software 'image' is securely downloaded at step 135. As known in the art, the software image may contain essential code, or operating system code, for basic operation of the subscriber device, and non-essential code, or application code, for performing higher level applications and operations. Also included in the new software image is a new manufacturer's certificate, which will replace the compromised manufacturer certificate. The device uses the new certificate thereafter. At step 140, the device is then rebooted to load the new software image that was downloaded at step 135.

After reboot, the device determines at step 145 whether the devices certificate field, or location, within the device's memory has been cleared, or overwritten. If not, a determination is made that the manufacturer credential was not verified at step 125. Thus, if a determination is made at step 145 that the device certificate has not been overwritten, then the process ends at step 150. If, however, a determination is made at step 145 that the device certificate in memory has been cleared, or overwritten, then the device downloads a new device certificate at step 155. The new device certificate is reissued by the new manufacturer CA using its new manufacturer private key.

The device verifies the authenticity of the new device certificate using the manufacturer's public key in the manufacturer's certificate that was contained in the new software image. If the device certificate is deemed not authentic at step 160, the process ends at step 150. If the device certificate is deemed authentic at step 160, the new device certificate is written to the device's memory at step 165 and the process ends at step 150.

If a root certificate CA has been compromised, method 100 may further comprise additional steps. For example, if the the root CA has been compromised, secure software download, as known in the art, may not be immediately available. To prepare for secure software download when a root CA has been compromised, additional information may be added to the configuration file. This information to add to the configuration file may include a reissued code verification certificate, a reissued root certificate, root certificate renewal credential information in addition to a manufacturer certificate renewal credential information. When the user device downloads the configuration file at step 120, instead of immediately verifying the manufacturer certificate based on the manufacturer certificate credential, the authenticity of the reissued root certificate is verified based on the root certificate renewal credential contained in the configuration file at step 170. If the authenticity of the reissued root certificate is not verified, process 100 proceeds step 150 and ends. If, however, the reissued root certificate is verified at step 170, process bypasses step 125 and clears the existing device certificate at step 130. Then, a new software image is downloaded using secure software download using the code verification certificate from the configuration file downloaded at step 120. Accordingly, process 100 performs step 170 instead of step 125 when the root CA is compromised, as shown by the broken lines in FIG. 1. Furthermore, additional information described above is added to the configuration file when the root CA has been compromised.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for remotely replacing a certificate associated with a device, comprising:
    identifying an update to security information used by the device;
    generating a configuration file for a device responsive to the update;
    including certificate credential information within the configuration file, wherein the certificate credential information is encrypted or signed using a private key associated with the device; and
    sending the configuration file over a communications network to the device in response to a TFTP request received from the device during a registration process for the device to join the communications network;

adding a reissued code verification certificate and manufacturer certificate renewal credential information to the configuration file, the reissued code verification certificate being operable to be used to verify the authenticity of a reissued root certificate based on root certificate renewal credential information and causes the device to download a new software image from a server based upon the authenticity of the reissued root certificate.

2. The method of claim 1 wherein the certificate credential information is associated with a manufacturer certificate authority.

3. The method of claim 1 wherein the certificate credential information is associated with a root certificate authority.

4. The method of claim 1 wherein a manufacturing certificate authority retrieves the private key associated with the device from a secure database for storing a plurality of device private keys.

5. The method of claim 1 wherein the new software image contains a manufacturer certificate.

6. The method of claim 1 wherein the new software image is securely downloaded.

7. The method of claim 1 further comprising:
rebooting the device using the new software image; downloading a reissued device certificate;
verifying the reissued device certificate using a new manufacturer certificate contained in the new software image; and
storing the reissued device certificate into a device memory.

8. The method of claim 6 wherein a secure software download is used to securely download the new software image based on the reissued code verification certificate.

9. The method of claim 7, further comprising overwriting an existing device certificate from the device memory.

10. A method for remotely replacing a device certificate, comprising:
writing certificate credential information into a configuration file, wherein the certificate credential information is based on a private key of the device; and
sending the configuration file to the device in response to a request;
verifying the configuration file based on the credential information;
overwriting an existing device certificate from a device memory;
wherein the credential information includes manufacturer certificate renewal credential information;
adding a reissued code verification certificate to the configuration file, the reissued code verification certificate being operable to be used to verify the authenticity of a reissued root certificate based on root certificate renewal credential information and causes the device to download a new software image from a server based upon the authenticity of the reissued root certificate.

11. The method of claim 10 wherein the existing device certificate is overwritten with null data.

12. The method of claim 10 further comprising:
downloading a new software image to the device from a server based on a server address contained in the configuration file.

13. The method of claim 12 wherein the new software image contains a manufacturer certificate.

14. The method of claim 12 wherein the new software image is securely downloaded.

15. The method of claim 13 further comprising:
rebooting the device using the new software image;
determining that the existing device certificate has been overwritten;
downloading a new device certificate;
verifying the new device certificate using the new manufacturer certificate contained in the new software image; and
storing the new device certificate into a device memory.

16. The method of claim 14 wherein a secure software download mechanism is used to securely download the new software image.

* * * * *